United States Patent
Kaneko

(10) Patent No.: US 11,471,875 B2
(45) Date of Patent: Oct. 18, 2022

(54) PROCESSING METHOD FOR VOLATILE LIQUID AND LIQUID PROCESSING APPARATUS

(71) Applicant: SHIMADZU CORPORATION, Kyoto (JP)

(72) Inventor: Naoki Kaneko, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 154 days.

(21) Appl. No.: 16/480,528

(22) PCT Filed: Dec. 22, 2017

(86) PCT No.: PCT/JP2017/046065
§ 371 (c)(1),
(2) Date: Jul. 24, 2019

(87) PCT Pub. No.: WO2018/139132
PCT Pub. Date: Aug. 2, 2018

(65) Prior Publication Data
US 2019/0376995 A1    Dec. 12, 2019

(30) Foreign Application Priority Data
Jan. 26, 2017   (JP) .............................. JP2017-012011

(51) Int. Cl.
*B01L 3/02*    (2006.01)
*G01N 35/10*   (2006.01)

(52) U.S. Cl.
CPC .......... *B01L 3/021* (2013.01); *G01N 35/1016* (2013.01)

(58) Field of Classification Search
CPC .................................................. G01N 35/1016
(Continued)

(56) References Cited

U.S. PATENT DOCUMENTS 5,312,757 A    5/1994   Matsuyama et al.
2003/0213905 A1*  11/2003  Lennon ................. B01L 3/0262
                                                       250/288

(Continued)

FOREIGN PATENT DOCUMENTS

JP    62-144073 A    6/1987
JP    62-228952 A    10/1987

(Continued)

OTHER PUBLICATIONS

Naoto Izumo et al., "Usage of the micro-pipette", The 82nd Japan Society for Analytical Chemistry Society Organic Trace Analysis Research Roundtable 98th Meeting of the Society of Measurement and Automation Control Mechanics Measurement Joint symposium (The 32nd presentation material), pp. 1-5, May 28, 2015.

(Continued)

*Primary Examiner* — Timothy L Maust
*Assistant Examiner* — Christopher M Afful
(74) *Attorney, Agent, or Firm* — Sughrue Mion, PLLC

(57) ABSTRACT

A processing method for a volatile liquid using a pipette includes a low-volatility liquid suction step of sucking a low-volatility liquid that is less volatile than the volatile liquid through the suction/ejection port, an air suction step of sucking air through the suction/ejection port after the low-volatility liquid suction step, and a volatile liquid suction step of sucking the volatile liquid through the suction/ejection port after the air suction step.

15 Claims, 12 Drawing Sheets

(58) Field of Classification Search
USPC .......................................................... 436/180
See application file for complete search history.

(56) References Cited

U.S. PATENT DOCUMENTS

| | | | | |
|---|---|---|---|---|
| 2007/0020763 A1* | 1/2007 | Ingenhoven | ............. | G01N 1/14 |
| | | | | 436/43 |
| 2013/0295597 A1* | 11/2013 | DeWitte | ................ | G01N 27/62 |
| | | | | 435/23 |

FOREIGN PATENT DOCUMENTS

| JP | 3-16648 A | 1/1991 |
|---|---|---|
| JP | 4-329363 A | 11/1992 |
| JP | 9-288113 A | 11/1997 |
| JP | 10-123026 A | 5/1998 |
| JP | 2011-22439 A | 2/2011 |

OTHER PUBLICATIONS

"Chapter III measure, Section 1 Measurement of Weight and Volume", https://ocw.kyoto-u.ac.jp/faculty-of-agriculture-jp/5129000/pdf/03.pdf , date unknown.

"Pipetting guide", https://www.aandd.co.jp/adhome/pdf/tech_doc/analytical/pipette_guide.pdf , Jan. 31, 2018.

International Search Report of PCT/JP2017/046065 dated Mar. 27, 2018 [PCT/ISA/210].

Communication dated Feb. 3, 2020 from Australian Patent Office in AU Application No. 2017396218.

Communication dated Apr. 14, 2020 by the Intellectual Property Office of Singapore in application No. 11201906078Q.

Communication dated May 18, 2020 by the European Patent Office in application No. 17893536.7.

Notice of Reasons for Refusal dated Jul. 14, 2020 from the Japanese Patent Office in Application No. 2018-564171.

Communication dated Jan. 15, 2021, from the Intellectual Property Office of India in application No. 201947031430.

Communication dated Jan. 28, 2021, from the Australian Patent Office in application No. 2017396218.

Communication dated Nov. 19, 2020 from the Australian Patent Office in Application No. 2017396218.

Written Opinion dated Oct. 21, 2020 of the Intellectual Property Office of Singapore in Application No. 11201906078Q.

Communication dated Mar. 16, 2021 in Japanese Application No. 2018-564171.

Communication dated Mar. 17, 2021 in European Application No. 17893536.7.

Communication dated May 25, 2021, from the China National Intellectual Property Administration in application No. 201780082947.3.

Communication dated Jul. 7, 2021, from the Intellectual Property office of Singapore in application No. 11201906078Q.

Communication dated Apr. 29, 2022, issued by the Intellectual Property Office of Singapore in application No. 10202109794X.

Office Action dated May 30, 2022 in Chinese Application No. 201780082947.3.

Communication dated Dec. 10, 2021 from The State Intellectual Property Office of P.R. of China in Application No. 201780082947.3.

Communication dated Nov. 19, 2021 from the Australian Patent Office in Australian Application No. 2021200667.

Communication dated Oct. 19, 2021 from the Singapore Patent Office in Singapore Application No. 10202109794X.

Communication dated Aug. 23, 2022 from the Japanese Patent Office in application No. 2021-099604.

* cited by examiner

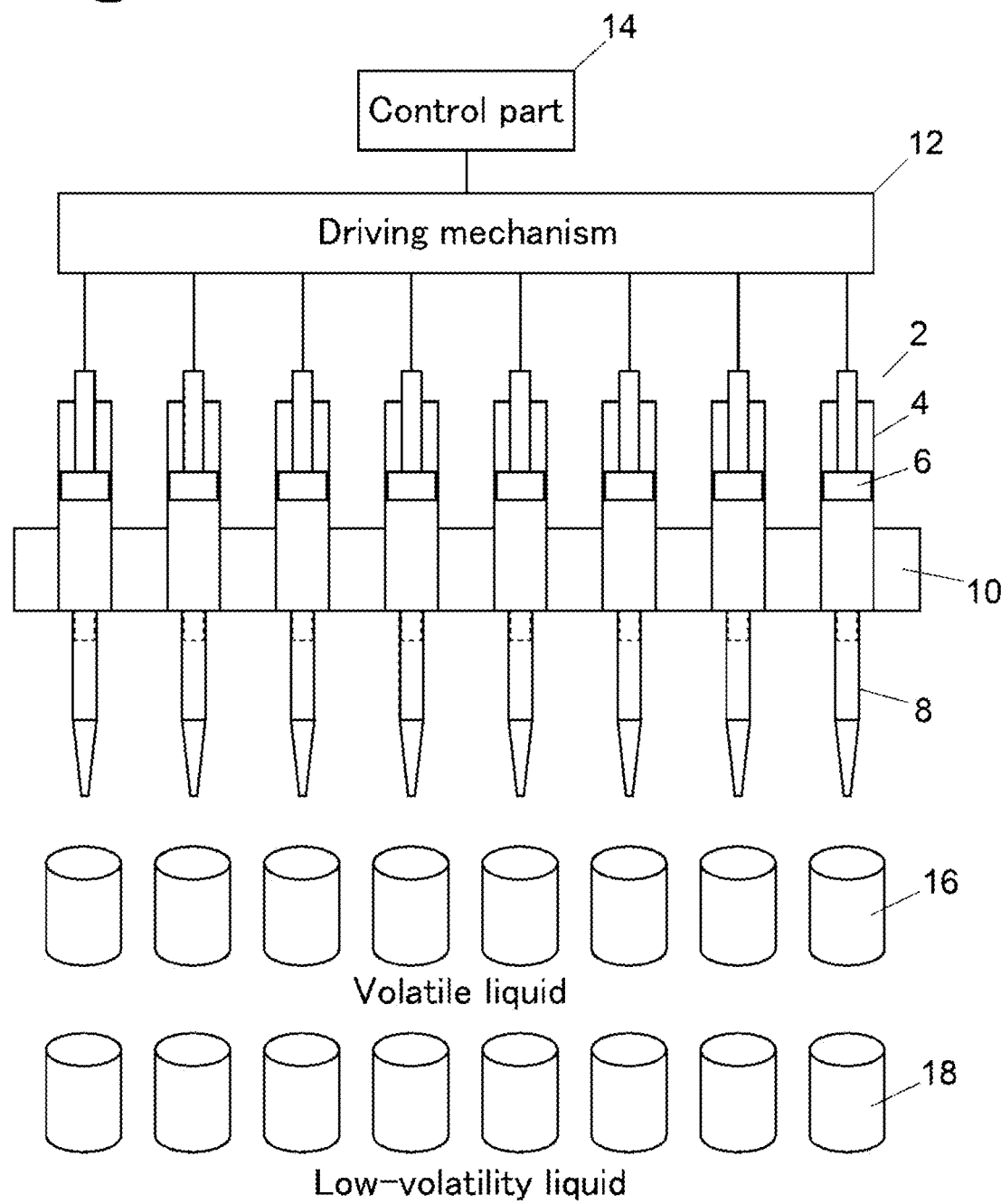

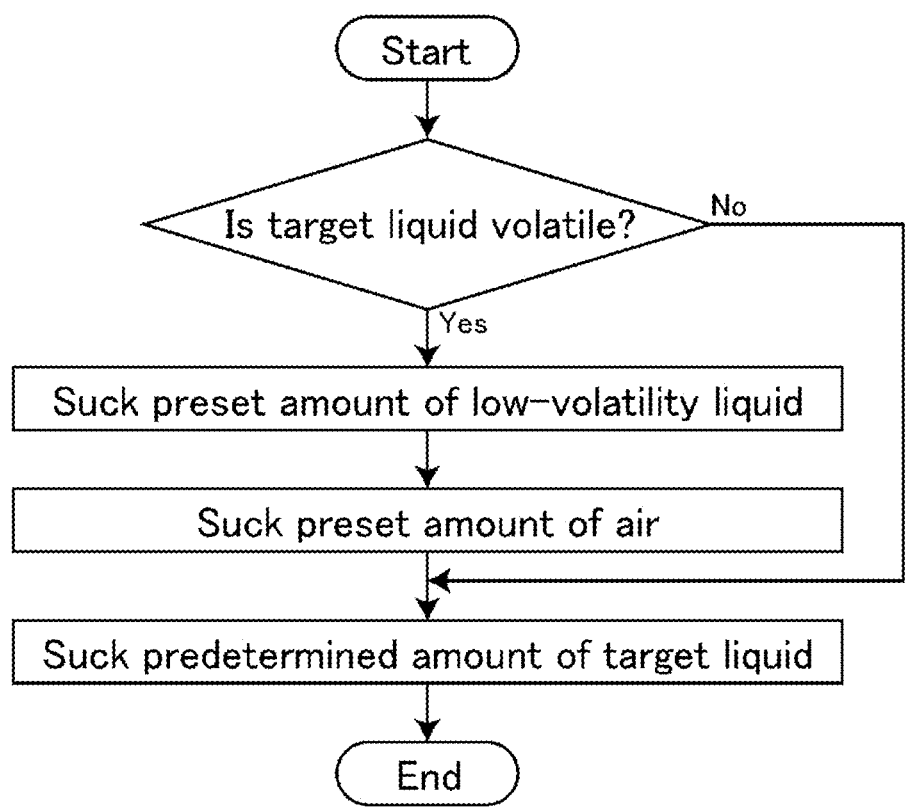

Fig. 4
(A) With pre-suction
0 second
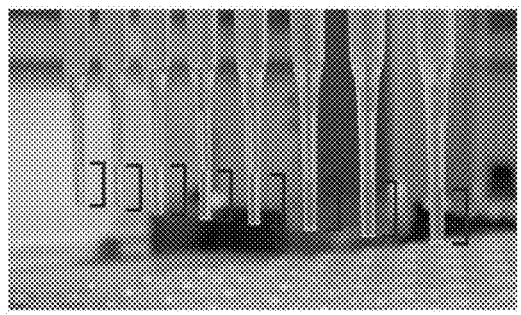
After 60 second
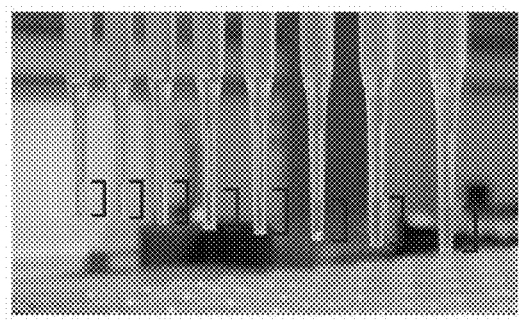
(B) Without pre-suction
0 second
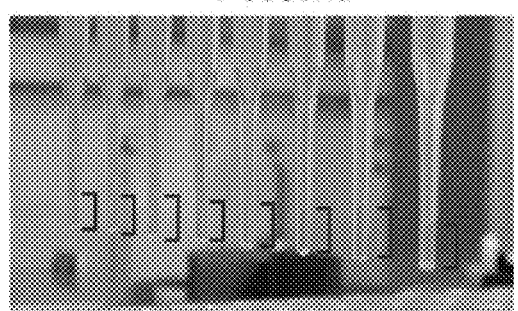
After 60 second
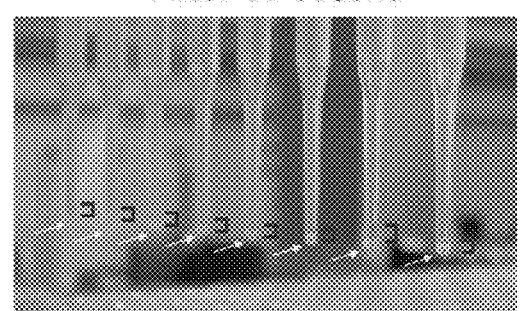

Air layer: 3 μL

US 11,471,875 B2

PROCESSING METHOD FOR VOLATILE LIQUID AND LIQUID PROCESSING APPARATUS

CROSS REFERENCE TO RELATED APPLICATIONS

This application is a National Stage of International Application No. PCT/JP2017/046065, filed Dec. 22, 2017, claiming priority to Japanese Patent Application No. 2017-012011, filed Jan. 26, 2017.

TECHNICAL FIELD

The present invention relates to a processing method for a volatile liquid using an air-replacement piston-type pipette and to a liquid processing apparatus that performs the processing method.

BACKGROUND ART

Air-replacement piston-type pipettes are widely used to measure and dispense liquids in physicochemical experiments. A piston-type pipette has a structure that can move air into and out of the cylinder by moving the piston up and down in the cylinder, and by adjusting the distance to move the piston up and down, liquid can be measured accurately in a tip attached to the tip end of the cylinder, while being sucked out.

Devices that operate piston-type pipettes electrically are also sold by various companies, and such devices are capable of continuous suction and continuous discharge. Examples of such automatic dispensing devices include Bravo available from Agilent, NIMBUS available from Affymetrix, epMotion available from Eppendorf, Microlab available from Hamilton, and Biomak available from Beckman Coulter.

Since a piston-type pipette measures a liquid by taking in and out air, there is a problem that, while it is possible to accurately measure a liquid of a low volatility such as water, it is difficult to accurately measure a liquid of a high volatility such as acetonitrile (ACN) or acetone because liquid leakage from a suction/ejection port after suction. The reason for this is considered to be that when a highly volatile liquid is sucked through the suction/ejection port, vapor of the volatile liquid changes the internal pressure of the cylinder of the pipette or the heat of vaporization due to evaporation changes the temperature in the cylinder, and thus, air in the cylinder expands and pushes out the volatile liquid. This is also disclosed in Non-Patent Document 1.

PRIOR ART DOCUMENTS

Non-Patent Documents

Non-Patent Document 1: The Joint Symposium of the 82nd Meeting of the Association of Organic Micro-Analysts of the Japan Society for Analytical Chemistry and the 98th Meeting of the Association of Measurement of Mechanical Quantities of the Society of Instrument and Control Engineers (the 32nd, presentation material) Theme: Dispensing operation using a micropipette Non-Patent Document 2: https://ocw.kyoto-u.ac.jp/ja/faculty-of-agriculture-jp/51 29000/pdf/03.pdf Non-Patent Document 3: https://www.aandd.co.jp/adhome/pdf/tech_doc/analytical/ pipette_guide.pdf

SUMMARY OF THE INVENTION

Problems to be Solved by the Invention

As described above, when handling a volatile liquid with a pipette or the like, the liquid is volatilized at the time of suction, whereby an air layer in the tip or the cylinder expands to increase the pressure, causing a phenomenon that the liquid is pushed out. This phenomenon is called liquid leak or liquid drip. This prevents accurate measurement of the liquid.

As a method to reduce the influence of volatilization of the volatile liquid, saturating the air layer with volatilized liquid molecules by repeatedly sucking and ejecting the liquid several times before measuring the volatile liquid is also proposed (see Non-Patent Documents 2 and 3). However, when such a method is adopted, although it has been possible to reduce the liquid leakage rate from the suction/ejection port, it has not been possible to completely eliminate the liquid leakage.

Further, since the above method intentionally volatilizes the liquid to be measured to saturate the air layer in the cylinder, a problem is that the amount of liquid to be measured is reduced by evaporation. For example, if the liquid to be measured is present by an amount of 500 µL, even if about 2 µL volatilizes and the amount becomes 498 µL, the reduction amount is about 4%, and the influence is small. However, if only a small amount of the liquid to be measured is present, for example, 5 µL, if about 2 µL of 5 µL volatilizes to make 3 µL, the amount of liquid is reduced by about 40%, and the influence is very critical.

Therefore, the above-mentioned method cannot be adopted when handling a very small amount such as only a few µL of volatile liquid.

Thus, an object of the present invention is to suppress liquid leakage from a pipette due to volatilization of volatile liquid.

Solutions to the Problems

A processing method according to the present invention is a processing method for a volatile liquid using a pipette including a cylinder, a piston that slides in the cylinder, and a tip attached to a tip end of the cylinder, the tip including a suction/ejection port, the pipette performing suction and ejection of a liquid through the suction/ejection port of the tip in accordance with movement of the piston. The processing method includes the following steps:
  a low-volatility liquid suction step of sucking a low-volatility liquid that is less volatile than the volatile liquid through the suction/ejection port;
  an air suction step of sucking air through the suction/ejection port after the low-volatility liquid suction step; and
  a volatile liquid suction step of sucking the volatile liquid through the suction/ejection port after the air suction step.

A liquid processing apparatus according to the present invention is an apparatus configured to perform the processing method described above using a pipette, and includes a pipette including a vertically positioned cylinder, a piston that slides in a vertical direction in the cylinder, and a tip, the tip being attached to a lower end of the cylinder in such a way that an suction/ejection port provided at a tip end of the tip faces downward, the pipette performing suction and ejection of a liquid through the suction/ejection port of the tip in accordance with movement of the piston, a driving mechanism that causes the pipette to operate, a volatile liquid container accommodating a volatile liquid, a low-volatility liquid container accommodating a low-volatility liquid that is less volatile than the volatile liquid and a Control part that controls the driving mechanism. The Control part is configured to control the driving mechanism in such a way that a low-volatility liquid suction operation of sucking a preset amount of the low-volatility liquid from the low-volatility liquid container, an air suction operation of sucking a preset amount of air through the suction/ejection port after the low-volatility liquid suction operation, and a volatile liquid suction operation of sucking a predetermined amount of the volatile liquid from the volatile liquid container after the air suction operation are performed in a course of sucking the volatile liquid by the pipette.

The low-volatility liquid in the present invention is a substance that has a boiling point of 95° C. or higher and is in a liquid state at normal temperature (20° C.±15° C.). Examples of such a low-volatility liquid include, for example, water, dimethylsulfoxide, glycerol, and phenol.

The volatile liquid in the present invention is a substance that has a boiling point in the range of 50 to 95° C. and is in a liquid state at normal temperature (20° C.±15° C.), or a liquid that contains 10% or more of such substance. Examples of the substance that has a boiling point in the range of 50 to 95° C. and is in a liquid state at normal temperature (20° C.±15° C.) include acetonitrile, methanol, ethanol, acetone, toluene, isopropanol, hexane, butanol, cyclohexane, ethylene glycol, benzene, chloroform, acetaldehyde, triethylamine, phenol, naphthalene, formaldehyde, tetrahydrofuran, and ethyl acetate.

Effects of the Invention

In the processing method for volatile liquid according to the present invention, since a volatile liquid is sucked after sucking a low-volatility liquid less volatile than the volatile liquid and air (hereinafter referred to as pre-suction), the volume of an air layer above the volatile liquid sucked into a pipette is smaller than in the case where the pre-suction is not performed. As a result, the volume expansion of the air layer expanding due to the volatilization of the volatile liquid is reduced, so that liquid leakage of the volatile liquid from the pipette is less likely to occur and thus, the measurement accuracy of the volatile liquid increases as compared with the case where the pre-suction is not performed.

In the liquid processing apparatus according to the present invention, since the Control part that controls the driving mechanism that drives the pipette is configured to perform suction of the volatile liquid after performing the above-described pre-suction in the process of sucking the volatile liquid by the pipette, liquid leakage of the volatile liquid from the pipette is less likely to occur, and the measurement accuracy of the volatile liquid is improved.

BRIEF DESCRIPTION OF THE DRAWINGS

FIG. 1 is a schematic configuration diagram illustrating an embodiment of a liquid processing apparatus.

FIG. 2 is a flowchart showing an example of a series of operations at the time of liquid suction according to the same embodiment.

FIG. 4 is an image diagram for comparing the remaining amount of liquid in the tip between the cases where pre-suction is performed and where pre-suction is not performed, (A) represents the case where the pre-suction is performed, and (B) represents the case where the pre-suction is not performed.

EMBODIMENT OF THE INVENTION

Figure 3A:
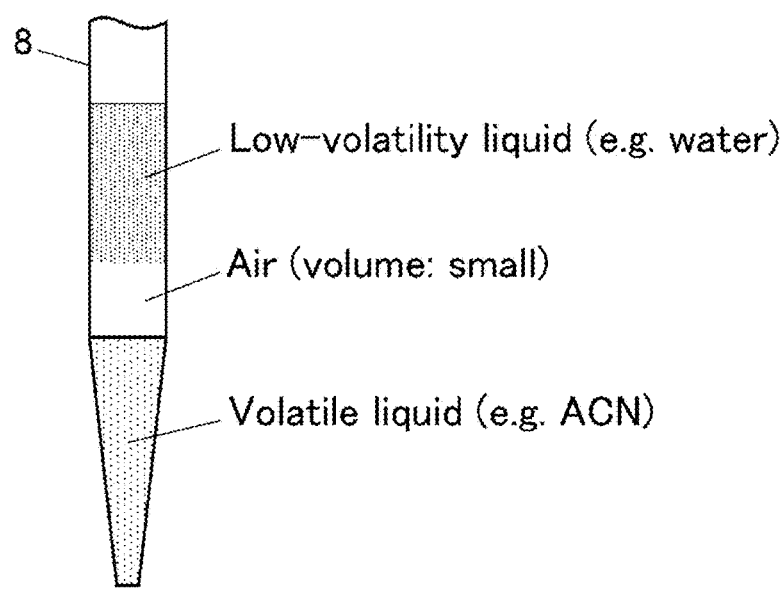
FIGS. 3(A) and 3(B) schematically illustrate states inside a tip after liquid suction according to the same embodiment.

Hereinafter, an embodiment of a processing method for a volatile liquid and a liquid processing apparatus that performs the processing method according to the present invention will be described with reference to the drawings.

First, an embodiment of the liquid processing apparatus will be described with reference to FIG. 1.

In the liquid processing apparatus of this embodiment, a plurality of pipettes 2 are held by a holder 10 in state of being arranged in a line. The pipette 2 includes a cylinder 4 disposed vertically, a piston 6 that slides in the vertical direction in the cylinder 4, and a tip 8 attached to a lower end of the cylinder 4. The tip 8 has a suction/ejection port at a tip end thereof, and the suction/ejection port faces vertically downward.

Each pipette 2 is configured to suck liquid or gas through the suction/ejection portion of the tip 8 in accordance with upward movement of the piston 6, and eject liquid or gas through the suction/ejection portion of the tip 8 in accordance with downward movement of the piston 6. In addition, the pipette 2 is configured to move in the horizontal in-plane direction and in the vertical direction, and suck and eject a liquid from and to a desired container. In this embodiment, all the pipettes 2 are held by the common holder 10, and by moving the holder 10 in the horizontal in-plane direction and in the vertical direction, each pipette 2 moves in the horizontal in-plane direction and in the vertical direction.

A driving mechanism 12 includes a mechanism for moving the piston 6 and a mechanism for moving the holder 10. The operation of the driving mechanism 12 is controlled by the Control part 14. A Control part 14 is realized by a general-purpose personal computer or a dedicated computer.

A plurality of volatile liquid containers 16 accommodating volatile liquids and a plurality of low-volatility liquid containers 18 accommodating low-volatility liquids are provided at positions lower than the pipettes 2 in correspondence with the respective pipettes 2.

Examples of the volatile liquids accommodated in the volatile liquid containers 16 include liquids such as acetonitrile, methanol, ethanol, acetone, toluene, isopropanol, hexane, butanol, cyclohexane, ethylene glycol, benzene, chloroform, acetaldehyde, triethylamine, phenol, naphthalene, formaldehyde, tetrahydrofuran, and ethyl acetate, and liquids containing 10% or more of such liquids.

Examples of the low-volatility liquids accommodated in the low-volatility liquid containers 18 include water, dimethylsulfoxide, glycerol, and phenol. The low-volatility liquids contained in the low-volatility liquid containers 18 are used when measuring off the above-mentioned volatile liquids, while sucking them out by the pipettes 2.

The Control part 14 is configured to control the driving mechanism 12 so that the following operation is performed when the liquid is sucked. A series of operations for sucking liquid will be described with reference to the flowchart of FIG. 2 with FIG. 1.

When the liquid suction operation is started, first, it is checked whether or not the liquid to be sucked is a volatile liquid. In order to check whether or not the liquid is a volatile liquid, for example, a list of volatile liquids is stored in a storage area of a data memory or the like provided in the Control part 14, and whether or not the liquid to be sucked is a volatile liquid is determined by comparing the liquid to be sucked with the list.

If the liquid to be sucked is not a volatile liquid, the liquid is sucked by a predetermined amount through the suction/ejection port at the tip end of each pipette 2. As a result of this, a predetermined amount of the liquid to be sucked is measured in the tip 8 attached to the tip end of each pipette 2. The liquid measured in each tip 8 is then dispensed into a predetermined dispensing container.

In contrast, in the case where the liquid to be sucked is a volatile liquid, a low-volatility liquid suction operation is performed first. In the low-volatility liquid suction operation, the pipette 2 is moved to the position of the corresponding low-volatility liquid container 18 to insert the tip end of each tip 8 into the low-volatility liquid container 18, and from each low-volatility liquid container 18, a preset amount of low-volatility liquid is sucked.

After the low-volatility liquid suction operation is completed, an air suction operation is performed. In the air suction operation, in a state where the tip 8 at the tip end of each pipette 2 is pulled out from the low-volatility liquid container 18, each pipette 2 is driven to suck, and each pipette 2 is thus caused to suck a preset amount of air. As a result, an air layer is formed below a low-volatility liquid layer in the pipette 2. Hereinafter, the low-volatility liquid suction operation and the air suction operation will be collectively referred to as "pre-suction".

After the above-mentioned pre-suction, the volatile liquid suction operation is performed. In the volatile liquid suction operation, the pipette 2 is moved to the position of the volatile liquid container 16 accommodating the volatile liquid to be sucked, and a predetermined amount of volatile liquid is sucked from each volatile liquid container 16.

By sequentially performing the low-volatility liquid suction operation, the air suction operation, and the volatile liquid suction operation as described above, that is, by performing the pre-suction before the volatile liquid suction operation, a layer of low-volatility liquid, an air layer, and a layer of a volatile liquid are formed in the tip 8 of the pipette 2 in this order from the proximal end side of the tip 8 as illustrated in FIG. 3(A).

Figure 3B:
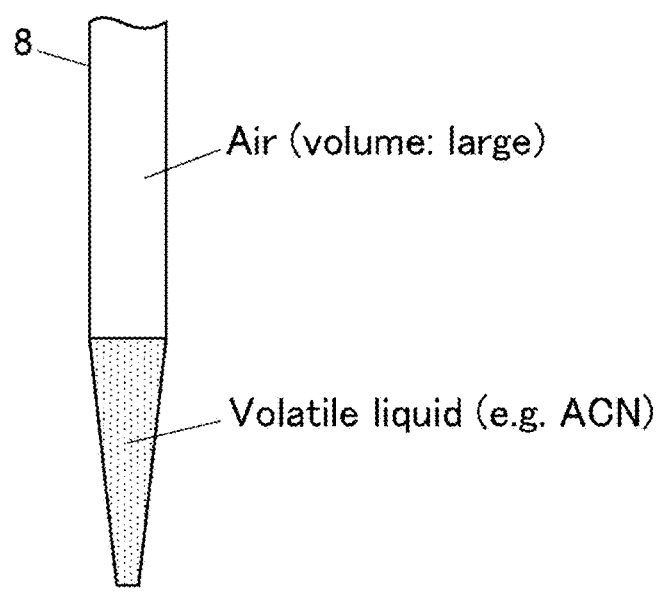

When the volatile liquid is sucked from the tip end of the tip 8 without performing the above-mentioned pre-suction, an air layer of a huge volume is generated between the volatile liquid and the piston 6 as illustrated in FIG. 3(B). If the volume of the air layer between the volatile liquid and the piston 6 is large, the volatilization of the volatile liquid causes the air layer to greatly expand, thereby pushing out the volatile liquid to cause liquid leakage.

In this embodiment, by performing the pre-suction before the volatile liquid suction operation, the volume of the air layer that can be expanded by volatilization of the volatile liquid becomes smaller than in the case where the pre-suction is not performed, therefore the expansion volume of the air layer due to the effect of volatilization also decreases, and liquid leakage from the tip end of the tip 8 becomes less likely to occur.

FIG. 4 is an image diagram obtained by capturing images of tips immediately (0 second) after suction of a 70% ACN solution and 60 seconds after suction of the 70% ACN solution (A) in the case where pre-suction was performed and (B) in the case where pre-suction was not performed.

In this test, an automatic dispensing apparatus Bravo (product of Agilent) was used as a liquid processing apparatus, and tips for 2 to 250 μL were attached to tip ends of pipettes of the apparatus. In (A) representing "with pre-suction", first, 10 μL of water as a low-volatility liquid was sucked, then 3 μL of air was sucked (pre-suction), and then 2 μL of a 70% ACN solution (70% ACN/30% $H_2O$ v/v) was sucked. In (B) representing "without pre-suction", 2 μL of the 70% ACN solution (70% ACN/30% $H_2O$ v/v) was sucked without performing pre-suction.

As a result of this test, both in the case of "with pre-suction" and in the case of "without pre-suction", 70% ACN solution of about the same amount exists at the tip ends of the tips immediately (0 second) after suction of the 70% ACN solution. However, after 60 seconds have passed (60 seconds later) since the 70% ACN solution was sucked, the amount of the 70% ACN solution at the tip ends of the tips was hardly reduced and no liquid leakage from the tip ends of the tips was observed in the case of "with pre-suction", and the amount of the 70% ACN solution at the tip ends of the tips was significantly reduced and liquid leakage from the tip ends of the tips was observed in the case of "without pre-suction". Therefore, it was confirmed from this test result that the liquid leakage from the tip end of the tip can be suppressed by performing the pre-suction.

Figure 5:
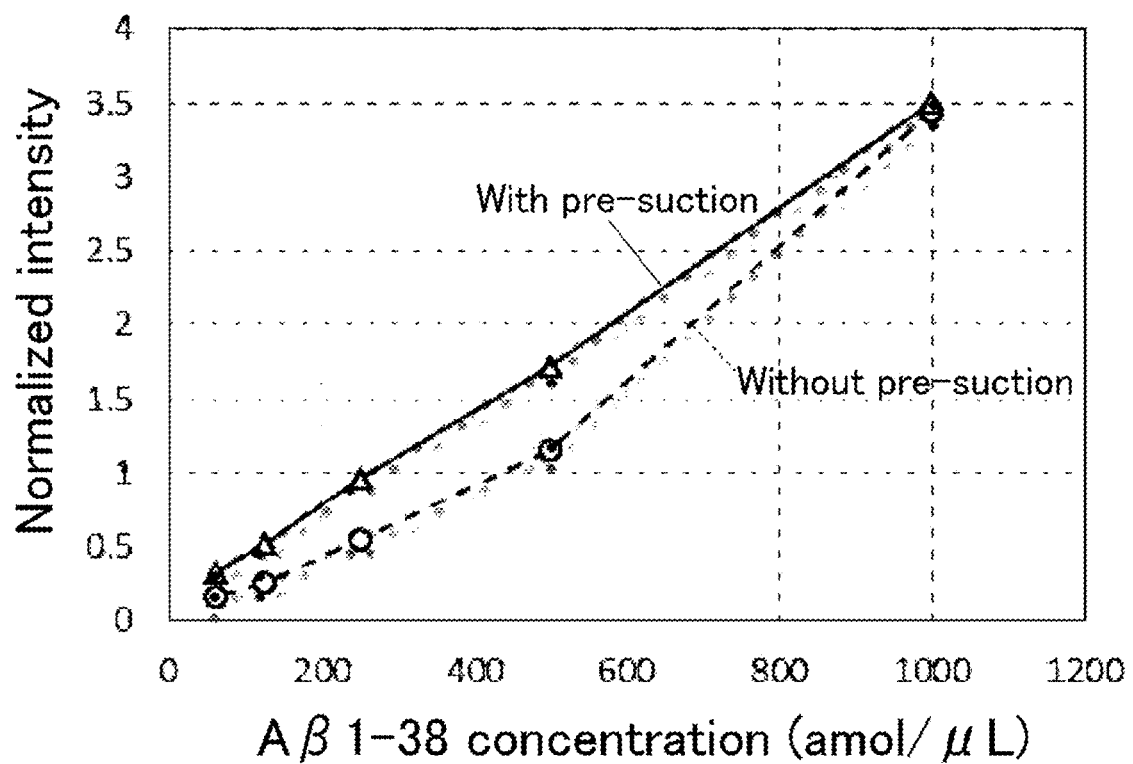
FIG. 5 is a graph showing peptide calibration curves by serial dilution in the cases where pre-suction is performed and where pre-suction is not performed.
Figure 6:
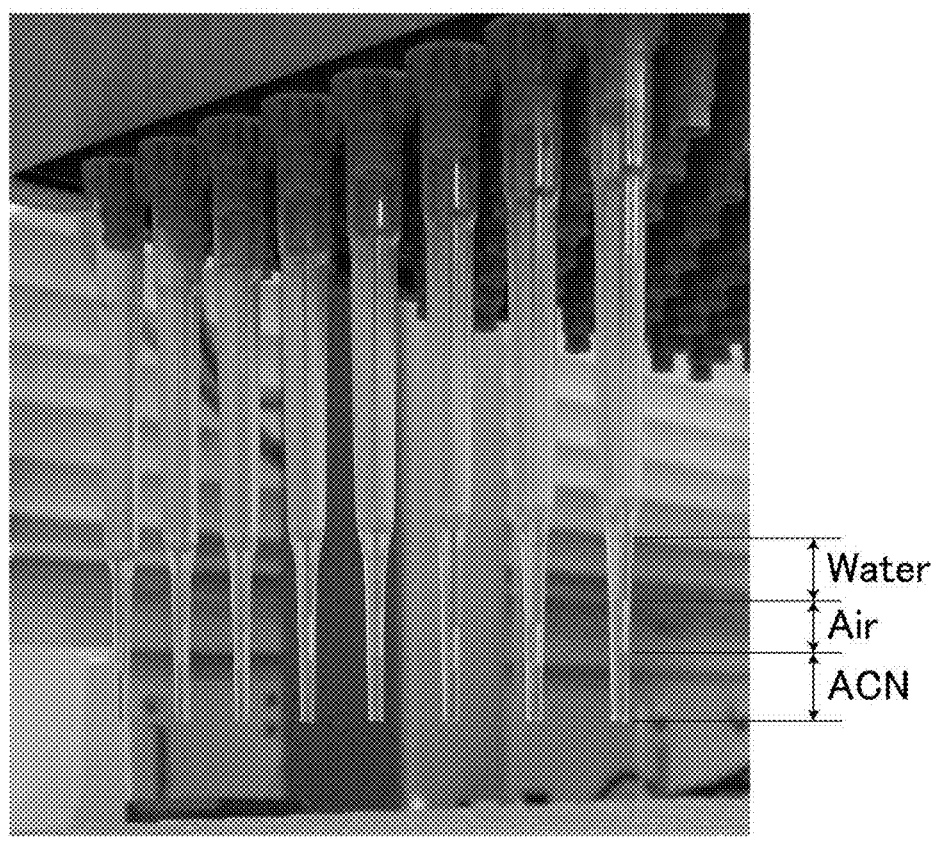
FIG. 6 is an image diagram showing the remaining amount of liquid in the tip when pre-suction is performed with an air layer volume of 2 μL.
Figure 7:
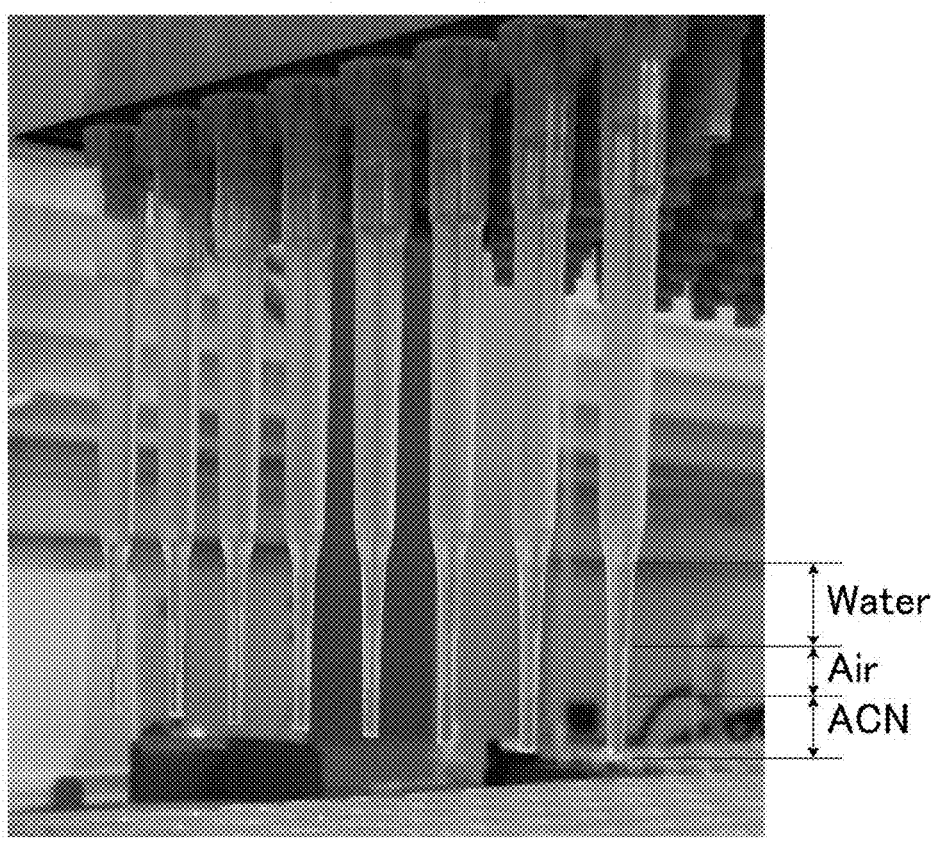
FIG. 7 is an image diagram showing the remaining amount of liquid in the tip when pre-suction is performed with an air layer volume of 3 μL.
Figure 8:
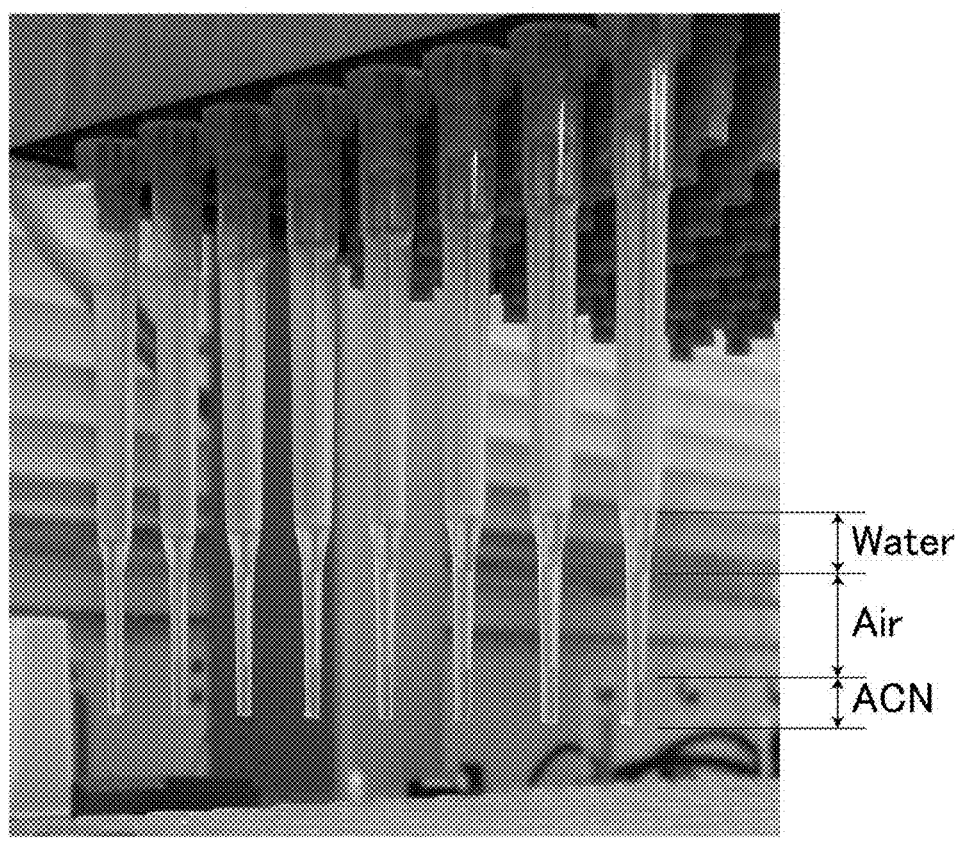
FIG. 8 is an image diagram showing the remaining amount of liquid in the tip when pre-suction is performed with an air layer volume of 5 μL.
Figure 9:
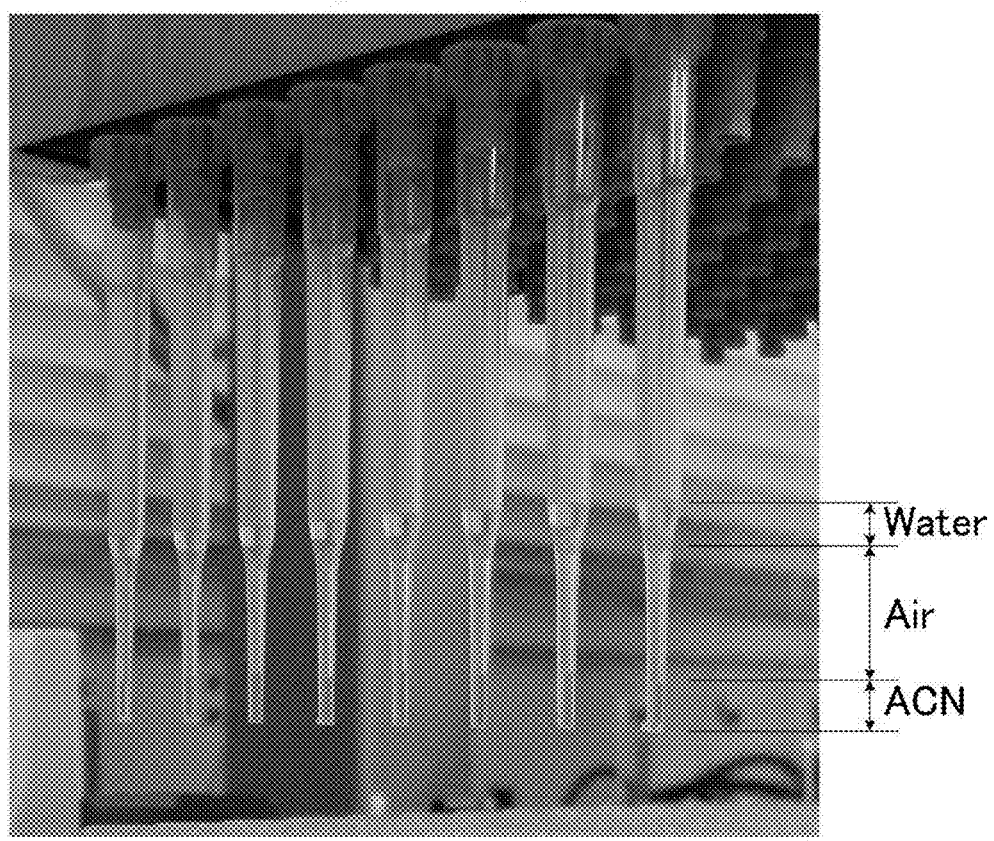
FIG. 9 is an image diagram showing the remaining amount of liquid in the tip when pre-suction is performed with an air layer volume of 10 μL.
Figure 10:
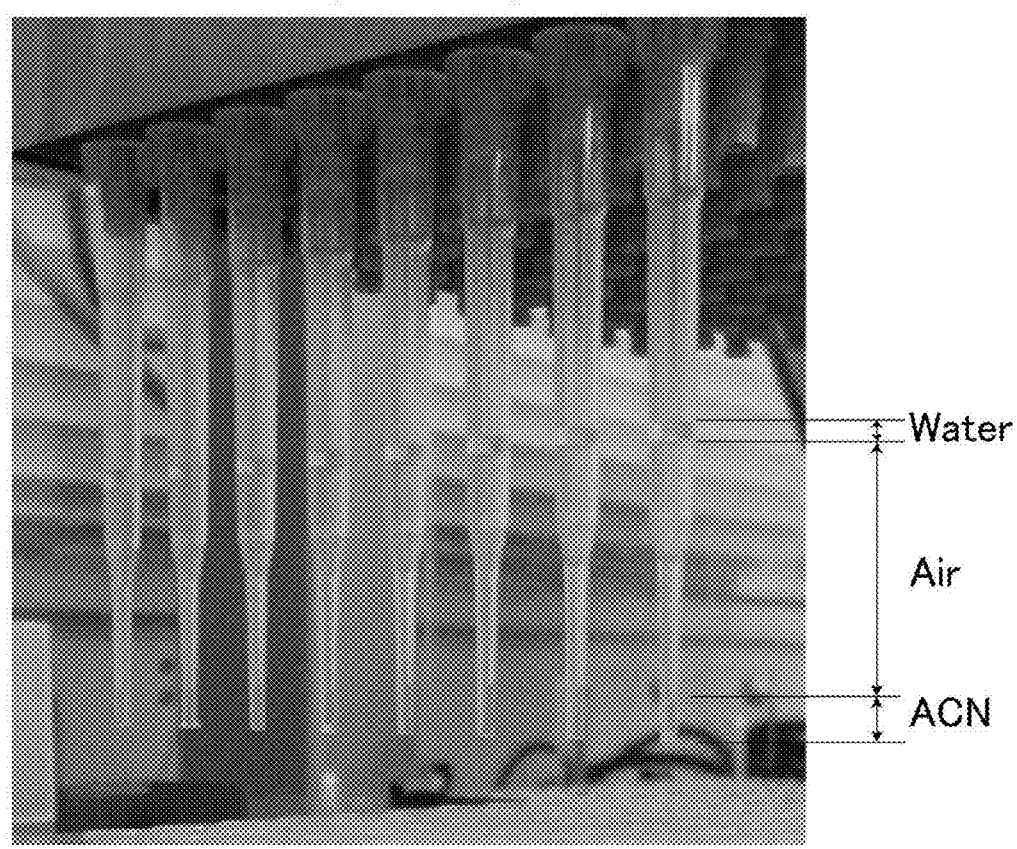
FIG. 10 is an image diagram showing the remaining amount of liquid in the tip when pre-suction is performed with an air layer volume of 50 μL.
Figure 11:
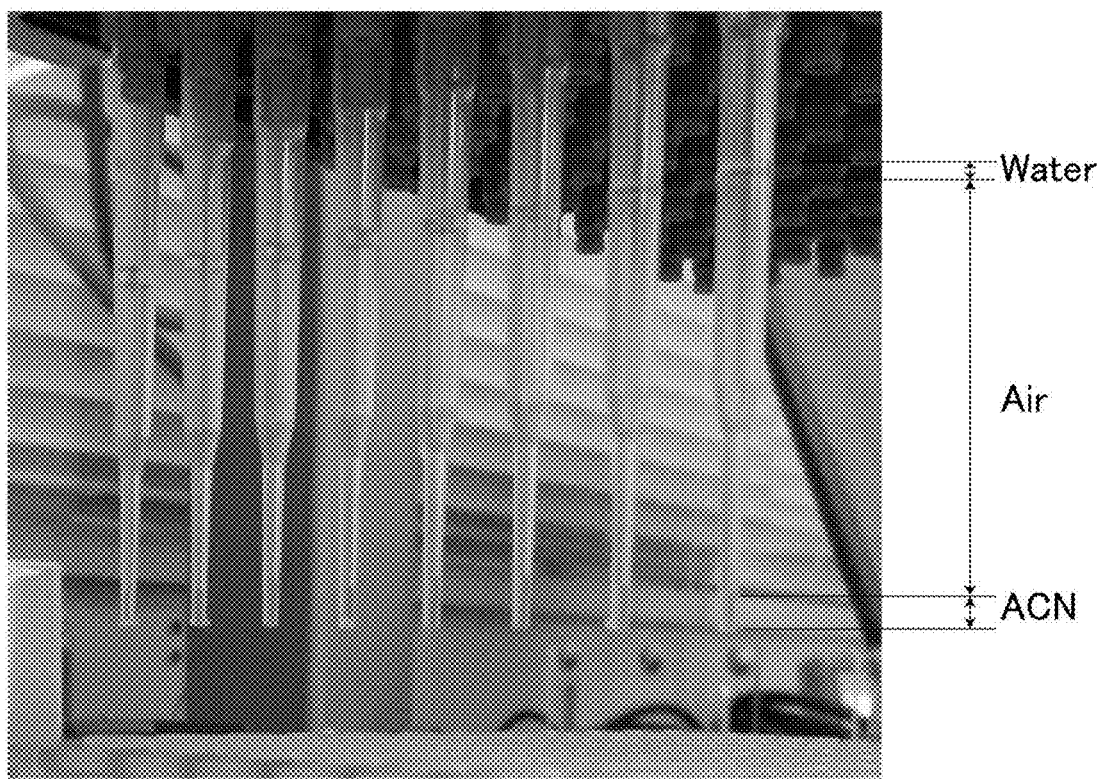
FIG. 11 is an image diagram showing the remaining amount of liquid in the tip when pre-suction is performed with an air layer volume of 100 μL.
Figure 12:
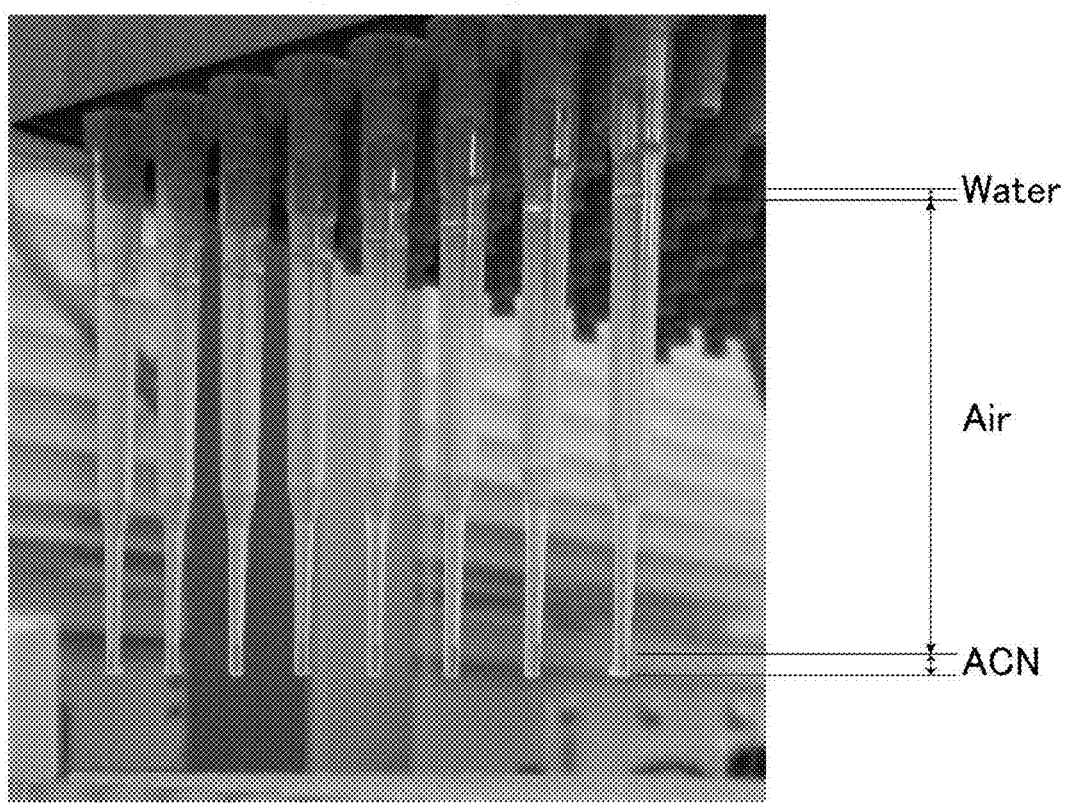
FIG. 12 is an image diagram showing the remaining amount of liquid in the tip when pre-suction is performed with an air layer volume of 150 μL.

FIG. 5 is a graph showing test results of peptide calibration curves by serial dilution in the cases where pre-suction is performed and where pre-suction is not performed. A solid line represents the case where pre-suction is performed, and a broken line represents the case where pre-suction is not performed.

In this test, Aβ1-38 peptide (2000 amol/μL) dissolved in a 70% acetonitrile (ACN) solution was serially diluted with the 70% ACN solution. Theoretically, the concentration of Aβ1-38 peptide becomes 1000 amol/μL, 500 amol/μL, 250 amol/μL, 125 amol/μL, and 62.5 amol/μL. In the 70% ACN solution, 250 amol/μL of stable isotope-labeled Aβ1-38 peptide (SIL-Aβ1-38) is dissolved as an internal standard for normalizing Aβ1-38 signals measured by a mass spectrometer (MALDI-TOF MS). The solution diluted by each method was added dropwise 1 μL at a time to μFocus MALDI Plate™ 900 μm and dried to solidify. 3 wells were dropped for each solution, and then measurement was performed by MALDI-TOF MS.

Mass spectral data was obtained by Linear TOF in a positive ion mode using AXIMA Performance (Shimadzu/KRATOS, Manchester, UK). The m/z value of Linear TOF was indicated by the average mass of the peak. The m/z values were calibrated using human angiotensin II, human ACTH fragment 18-39, bovine insulin oxidized beta-chain, and bovine insulin as external standard.

A signal obtained by normalizing the obtained signal of Aβ1-38 with a signal of SIL-Aβ1-38 was regarded as normalized intensity (Normalized intensity). A calibration curve was prepared using the Aβ 1-38 concentration and the normalized intensity, and comparison was made between the case where pre-suction was performed and the case where pre-suction was not performed. In the case where the pre-suction was not performed, the normalized intensity when the concentration was diluted by 2 times was reduced by more than a half, and linearity was not shown. In contrast, in the case where the pre-suction was performed, the normalized intensity was also reduced to half when the concentration was diluted by 2 times, and thus, linearity was shown. Since the coefficient of determination ($R^2$) in the linear regression equation was $R^2=0.9718$ for the conventional method and $R^2=0.9993$ for the case where the pre-suction was performed, it was shown that linear fitting can be performed by performing the pre-suction. These results show that only an amount smaller than an intended amount was injected due to liquid leakage in the case where the pre-suction was not performed, and the liquid leakage was suppressed and a liquid of about the same amount as the intended amount was accurately injected in the case where the pre-suction was performed.

The results described above show that, by performing the pre-suction, liquid leakage from the tip ends of the pipettes 2 can be suppressed, and the measurement accuracy of the volatile liquid can be improved.

FIGS. 6 to 12 are image diagrams showing results of tests on a relationship between the amount of air suction and the liquid leakage suppressing effect in the pre-suction. These images were obtained by photographing, from obliquely below, tips attached to the lower ends of cylinders. In this test, as the pre-suction, after 10 μL of water was sucked, 2 μL (FIG. 6), 3 μL (FIG. 7), 5 μL (FIG. 8), 10 μL (FIG. 9), 50 μL (FIG. 10), 100 μL (FIG. 11), or 150 μL (FIG. 12) of air was sucked, then 2 μL of 70% ACN solution was sucked, and then the state inside the tip was observed after the elapse of 60 seconds.

As a result of this test, it was found that, in the case where the amount of air suction was 10 μL or less, almost no reduction was observed in the amount of 70% ACN solution in the tip even after the elapse of 60 seconds after suction, and liquid leakage was suppressed. However, in the case where the amount of air suction was 50 μL or 100 μL, it was found that reduction of the amount of the 70% ACN solution in the tip was observed 60 seconds after the suction, and liquid leakage occurred.

From this test, it was confirmed that, although it is possible to suppress the liquid leakage of the volatile liquid by performing the pre-suction, the volume of expansion due to the influence of the volatilization of the volatile liquid becomes greater, and the effect of suppressing liquid leakage is degraded in the case where the volume of the air layer between the low-volatility liquid and the volatile liquid is larger. Under the conditions used in this test, it was confirmed that, if the amount of air suction is 10 μL or less, the amount of reduction of the volatile liquid can be suppressed within 10% of the amount of suction, and a sufficient liquid leakage suppression effect can be achieved. The amount of air suction in the pre-suction can be adjusted to an appropriate amount in accordance with the volatility and the amount of suction of the volatile liquid.

Although a liquid processing apparatus provided with a plurality of pipettes 2 is described above as an example, the processing method and the liquid processing apparatus of the present invention are not limited thereto, and can be also applied to a processing method and a liquid processing apparatus using only one pipette.

Further, the processing method of the present invention is not only implemented in the liquid processing apparatus described in the above embodiment, but can also be implemented in the case where a liquid is processed by manually handling a pipette.

DESCRIPTION OF REFERENCE SIGNS

2: Pipette
4: Cylinder
6: Piston
8: Tip
10: Holder
12: Driving mechanism
14: Control part
16: Volatile liquid Container
18: Low-volatility liquid container

The invention claimed is:

1. A processing method for a volatile liquid to be sucked using a pipette including a cylinder, a piston that slides in the cylinder, and a tip attached to a tip end of the cylinder, the tip including a suction/ejection port, the pipette being configured to perform suction of a liquid into the tip by increasing an air filling the cylinder in accordance with movement of the piston and to perform ejection of the liquid from the tip by reducing the air filling the cylinder in accordance with movement of the piston, the processing method comprising:
a low-volatility liquid suction step of sucking a low-volatility liquid that is less volatile than the volatile liquid into the tip through the suction/ejection port;
an air suction step of sucking air into the tip through the suction/ejection port after the low-volatility liquid suction step; and
a liquid suction step of sucking the volatile liquid into the tip through the suction/ejection port after the air suction step,
wherein the low-volatility liquid is a substance that has a boiling point of 95° C. or higher and is in a liquid state at normal temperature, and
wherein the volatile liquid is a substance that has a boiling point in the range of 50 to 95° C. and is in a liquid state at normal temperature, or is a liquid that contains 10% or more of the substance.

2. The processing method according to claim 1, wherein the low-volatility liquid is any one of water, dimethyl sulfoxide, glycerol, and phenol.

3. The processing method according to claim 1, wherein the volatile liquid is any one of acetonitrile, methanol, ethanol, acetone, toluene, isopropanol, hexane, butanol, cyclohexane, ethylene glycol, benzene, chloroform, acetaldehyde, triethylamine, phenol, naphthalene, formaldehyde, tetrahydrofuran, and ethyl acetate, or a liquid containing 10% or more of these.

4. A liquid processing apparatus comprising:
a pipette including a vertically positioned cylinder, a piston that slides in a vertical direction in the cylinder, and a tip, the tip being attached to a lower end of the cylinder in such a way that an suction/ejection port provided at a tip end of the tip faces downward, the pipette performing suction and ejection of a liquid through the suction/ejection port of the tip in accordance with movement of the piston;
a driving mechanism that causes the pipette to operate;
a volatile liquid container accommodating a liquid to be sucked;
a low-volatility liquid container accommodating a low-volatility liquid; and
a control part that controls the driving mechanism,
wherein the control part is configured to control the driving mechanism in such a way that, in a case where the liquid to be sucked is a volatile liquid, a low-volatility liquid suction operation of sucking a preset amount of the low-volatility liquid from the low-volatility liquid container, and an air suction operation of sucking a preset amount of air through the suction/ejection port after the low-volatility liquid suction operation are performed before a liquid suction operation of sucking a predetermined amount of the liquid to be sucked from the liquid container is performed,
wherein the control part is configured to control the driving mechanism in such a way that, in a case where the liquid to be sucked is not a volatile liquid, the liquid suction operation is performed without the low-volatility liquid suction operation and the air suction operation,
wherein the low-volatility liquid is a substance that has a boiling point of 95° C. or higher and is in a liquid state at normal temperature, and
wherein the volatile liquid is a substance that has a boiling point in the range of 50 to 95° C. and is in a liquid state at normal temperature, or is a liquid that contains 10% or more of the substance.

5. The liquid processing apparatus according to claim 4, wherein the low-volatility liquid is any one of water, dimethyl sulfoxide, glycerol, and phenol.

6. The liquid processing apparatus according to claim 4, wherein the volatile liquid is any one of acetonitrile, methanol, ethanol, acetone, toluene, isopropanol, hexane, butanol, cyclohexane, ethylene glycol, benzene, chloroform, acetaldehyde, triethylamine, phenol, naphthalene, formaldehyde, tetrahydrofuran, and ethyl acetate, or a liquid containing 10% or more of these.

7. The processing method according to claim 1, wherein the processing method further comprises, before the air suction step, a determining step of determining the amount of air sucked through the suction/ejection port in the air suction step in accordance with the volatility of the liquid to be sucked and the sucking amount of the liquid to be sucked in the volatile liquid suction step.

8. The processing method according to claim 1, wherein the amount of air sucked through the suction/ejection port in the air suction step is 10 µL or less.

9. The liquid processing apparatus according to claim 4, wherein the amount of air sucked through the suction/ejection port in the air suction step is 10 µL or less.

10. The liquid processing apparatus according to claim 4, wherein the control part stores a list of volatile liquids, and is configured to determine whether the liquid to be sucked is a volatile liquid based on the list.

11. A liquid processing apparatus comprising:
a pipette including a vertically positioned cylinder, a piston that slides in a vertical direction in the cylinder, and a tip, the tip being attached to a lower end of the cylinder in such a way that an suction/ejection port provided at a tip end of the tip faces downward, the pipette being configured to perform suction of a liquid into the tip by increasing an air filling the cylinder in accordance with movement of the piston and to perform ejection of the liquid from the tip by reducing the air filling the cylinder in accordance with movement of the piston;
a driving mechanism that causes the pipette to operate;
a volatile liquid container accommodating a volatile liquid;
a low-volatility liquid container accommodating a low-volatility liquid; and
a control part that controls the driving mechanism,
wherein the control part is configured to control the driving mechanism in such a way that, a low-volatility liquid suction operation of sucking a preset amount of the low-volatility liquid from the low-volatility liquid container, an air suction operation of sucking a preset amount of air through the suction/ejection port after the low-volatility liquid suction operation are performed, and a liquid suction operation of sucking a predetermined amount of the volatile liquid from the volatile liquid container is performed,
wherein the low-volatility liquid is a substance that has a boiling point of 95° C. or higher and is in a liquid state at normal temperature, and
wherein the volatile liquid is a substance that has a boiling point in the range of 50 to 95° C. and is in a liquid state at normal temperature, or is a liquid that contains 10% or more of the substance.

12. The liquid processing apparatus according to claim 11, wherein the low-volatility liquid is any one of water, dimethyl sulfoxide, glycerol, and phenol.

13. The liquid processing apparatus according to claim 11, wherein the volatile liquid is any one of acetonitrile, methanol, ethanol, acetone, toluene, isopropanol, hexane, butanol, cyclohexane, ethylene glycol, benzene, chloroform, acetaldehyde, triethylamine, phenol, naphthalene, formaldehyde, tetrahydrofuran, and ethyl acetate, or a liquid containing 10% or more of these.

14. The liquid processing apparatus according to claim 11, wherein the amount of air sucked through the suction/ejection port in the air suction step is 10 µL or less.

15. The liquid processing apparatus according to claim 11, wherein the control part stores a list of volatile liquids, and is configured to determine whether a liquid into the chip is a volatile liquid or not based on the list.

* * * * *